(12) United States Patent
Masuda

(10) Patent No.: US 10,778,903 B2
(45) Date of Patent: Sep. 15, 2020

(54) IMAGING APPARATUS, IMAGING METHOD, AND PROGRAM

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/357,857

(22) Filed: Mar. 19, 2019

(65) Prior Publication Data

US 2019/0215433 A1 Jul. 11, 2019

Related U.S. Application Data

(63) Continuation of application No. PCT/JP2017/035300, filed on Sep. 28, 2017.

(30) Foreign Application Priority Data

Oct. 4, 2016 (JP) ................. 2016-196547

(51) Int. Cl.
*H04N 5/235* (2006.01)
*H04N 5/232* (2006.01)
(Continued)

(52) U.S. Cl.
CPC ........... *H04N 5/2355* (2013.01); *G03B 7/091* (2013.01); *G03B 15/00* (2013.01); *H04N 5/235* (2013.01);
(Continued)

(58) Field of Classification Search
CPC .... H04N 5/2353; H04N 5/2351; H04N 5/235; H04N 5/2322; H04N 5/2352;
(Continued)

(56) References Cited

U.S. PATENT DOCUMENTS 6,859,230 B2 * 2/2005 Luo .................. H04N 3/14
348/297
7,990,433 B2 8/2011 Yamashita
(Continued)

FOREIGN PATENT DOCUMENTS

CN 101399924 A 4/2009
CN 101566889 A 10/2009
(Continued)

OTHER PUBLICATIONS

International Preliminary Report on Patentability and Written Opinion of the International Searching Authority(Forms PCT/IB/326, PCT/IB/373 and PCT/ISA/237), dated Apr. 18, 2019, for International Application No. PCT/JP2017/035300, with an English Translation of the Written Opinion.
(Continued)

*Primary Examiner* — Marly S Camargo
(74) *Attorney, Agent, or Firm* — Birch, Stewart, Kolasch & Birch, LLP

(57) ABSTRACT

An object of the present invention is to provide an imaging apparatus, an imaging method, and a program that can leave information related to gradations on a high brightness side and a low brightness side as far as possible even in a case where a scene has a wide dynamic range and a histogram of a captured image is biased. An imaging apparatus (10) includes an exposure setting unit (101), an image acquisition unit, a brightness information acquisition unit (103), a count unit that counts each of the number of darkened pixels, the number of low brightness pixels, the number of washed out pixels, and the number of high brightness pixels, a calculation unit that calculates a first ratio between the number of darkened pixels and the number of low brightness pixels and a second ratio between the number of washed out pixels and the number of high brightness pixels, and an exposure adjustment unit that adjusts a first exposure to a second
(Continued)

exposure based on the first ratio and the second ratio calculated by the calculation unit.

10 Claims, 10 Drawing Sheets

(51) Int. Cl.
| | |
|---|---|
| *H04N 5/228* | (2006.01) |
| *H04N 5/355* | (2011.01) |
| *H04N 1/407* | (2006.01) |
| *G06T 5/50* | (2006.01) |
| *G06T 7/00* | (2017.01) |
| *G06K 9/40* | (2006.01) |
| *G03B 15/00* | (2006.01) |
| *G03B 7/091* | (2006.01) |
| *H04N 5/238* | (2006.01) |

(52) U.S. Cl.
CPC .......... *H04N 5/238* (2013.01); *H04N 5/2351* (2013.01); *H04N 5/2352* (2013.01); *H04N 5/2353* (2013.01)

(58) Field of Classification Search
CPC ...... H04N 5/353; H04N 5/355; H04N 5/3556; H04N 5/228; H04N 5/68; H04N 1/4078; G06T 5/50; G06T 7/007; G06T 2207/20208; G06T 2207/10096; G06K 9/40; G03B 7/093; G03B 7/091
USPC ...... 348/229.1, 221.1, 222.1, 235, 255, 234, 348/396.1, 489, 301, 302, 311, 237, 362, 348/294; 382/274, 270, 276
See application file for complete search history.

(56) References Cited

U.S. PATENT DOCUMENTS

| | | | | |
|---|---|---|---|---|
| 10,432,854 | B2* | 10/2019 | Hirayama | H04N 5/23229 |
| | | | | 348/222.1 |
| 2004/0096124 | A1* | 5/2004 | Nakamura | H04N 5/355 |
| | | | | 348/196 |
| 2004/0141075 | A1* | 7/2004 | Xu | H04N 5/335 |
| | | | | 348/362 |
| 2005/0195314 | A1* | 9/2005 | Fossum | H04N 5/2352 |
| | | | | 348/229.1 |
| 2007/0177050 | A1 | 8/2007 | Xiao et al. | |
| 2007/0195385 | A1* | 8/2007 | Masuzaka | H04N 1/6086 |
| | | | | 358/3.21 |
| 2008/0266424 | A1* | 10/2008 | Asoma | H04N 5/235 |
| | | | | 348/362 |
| 2008/0272999 | A1* | 11/2008 | Kurakawa | G09G 3/3611 |
| | | | | 345/102 |
| 2009/0002530 | A1* | 1/2009 | Arai | H04N 5/335 |
| | | | | 348/294 |
| 2009/0303343 | A1 | 12/2009 | Drimbarean et al. | |
| 2010/0195901 | A1* | 8/2010 | Andrus | G06K 9/40 |
| | | | | 382/274 |
| 2010/0245620 | A1* | 9/2010 | Arai | H04N 5/235 |
| | | | | 348/229.1 |
| 2011/0157425 | A1* | 6/2011 | Nakayama | H04N 9/68 |
| | | | | 348/234 |
| 2011/0216220 | A1 | 9/2011 | Chiang et al. | |
| 2013/0208139 | A1 | 8/2013 | Lin et al. | |
| 2013/0251357 | A1 | 9/2013 | Kubota | |
| 2014/0022408 | A1 | 1/2014 | Nashizawa | |
| 2014/0168486 | A1 | 6/2014 | Geiss | |
| 2014/0176789 | A1 | 6/2014 | Kubota | |
| 2015/0116582 | A1* | 4/2015 | Yoshikawa | H04N 5/2353 |
| | | | | 348/362 |
| 2015/0130967 | A1* | 5/2015 | Pieper | H04N 5/2355 |
| | | | | 348/362 |
| 2015/0201109 | A1 | 7/2015 | Li | |
| 2017/0201665 | A1 | 7/2017 | Yokoya | |

FOREIGN PATENT DOCUMENTS

| | | |
|---|---|---|
| CN | 102104785 A | 6/2011 |
| CN | 102262330 A | 11/2011 |
| CN | 103248828 A | 8/2013 |
| CN | 103581565 A | 2/2014 |
| CN | 103826006 A | 5/2014 |
| CN | 103888644 A | 5/2014 |
| JP | 2007-201979 A | 8/2007 |
| JP | 2008-48251 A | 2/2008 |
| JP | 2008-131530 A | 6/2008 |
| JP | 2012-205031 A | 10/2012 |
| JP | 2016-6930 A | 1/2016 |

OTHER PUBLICATIONS

International Search Report, dated Nov. 7, 2017, for International Application No. PCT/JP2017/035300, with an English translation.
Chinese Office Action and Search Report dated May 14, 2020, for counterpart Chinese Patent Application No. 201780061779.X, with partial translation.

* cited by examiner

FIG. 8

| ×1 | ×1 | ×1 | ×1 | ×1 |
|---|---|---|---|---|
| ×1 | ×2 | ×2 | ×2 | ×1 |
| ×1 | ×2 | ×4 | ×2 | ×1 |
| ×1 | ×2 | ×2 | ×2 | ×1 |
| ×1 | ×1 | ×1 | ×1 | ×1 |

FIG. 9

| ×1 | ×1 | ×1 | ×1 | ×1 |
|---|---|---|---|---|
| ×1 | ×1 | ×1 | ×1 | ×1 |
| ×1 | ×1 | ×4 | ×4 | ×4 |
| ×1 | ×1 | ×4 | ×4 | ×4 |
| ×1 | ×1 | ×4 | ×4 | ×4 | ated art, a technology for performing exposure

IMAGING APPARATUS, IMAGING METHOD, AND PROGRAM

CROSS-REFERENCE TO RELATED APPLICATIONS

The present application is a Continuation of PCT International Application No. PCT/JP2017/035300 filed on Sep. 28, 2017 claiming priority under 35 U.S.C § 119(a) to Japanese Patent Application No. 2016-196547 filed on Oct. 4, 2016. Each of the above applications is hereby expressly incorporated by reference, in their entirety, into the present application.

BACKGROUND OF THE INVENTION

1. Field of the Invention

The present invention relates to an imaging apparatus, an imaging method, and a program and particularly, to an imaging apparatus, an imaging method, and a program performing exposure control.

2. Description of the Related Art

In the related art, a technology for performing exposure control in accordance with an imaged scene or subject has been suggested.

For example, JP2007-201979A suggests a technology for the purpose of improving image quality of the face of a person. Specifically, JP2007-201979A suggests a technology for performing exposure control by comparing histograms of a set target brightness range with the brightness of the face of the person (claim 1).

SUMMARY OF THE INVENTION

JP2007-201979A discloses a washout amount and a darkening amount as one factor for deciding the setting of the target brightness range (FIG. 13 and Paragraph 0080). That is, JP2007-201979A discloses shifting the target brightness range to a high brightness side as the darkening amount is increased, and shifting the target brightness range to a low brightness side as the washout amount is increased (Paragraph 0080). The washout amount in JP2007-201979A indicates the frequency of occurrence of washout. For example, the washout amount can be calculated from how much higher the frequency in a predetermined high brightness region is than a threshold. The darkening amount indicates the frequency of occurrence of darkening. For example, the darkening amount can be calculated from high much higher the frequency in a predetermined low brightness region is than a threshold (Paragraph 0080).

In the technology disclosed in JP2007-201979A, the exposure control is performed by setting the target brightness range based on the washout amount and the darkening amount. However, in a case where the exposure control is simply performed based on the washout amount (frequency of occurrence of washout) and the darkening amount (frequency of occurrence of darkening), gradations may not be left on both of the high brightness side and the low brightness side in a case where the frequency in the histogram is biased to the high brightness side or the low brightness side. That is, in a case where the exposure control is simply performed using the number of washed out pixels and the number of darkened pixels as an evaluation value, gradations are distributed in a biased manner to either the high brightness side or the low brightness side, and a case where gradations on the other side are reduced occurs. Consequently, in a case where the exposure control is performed using the number of washed out pixels and the number of darkened pixels as the evaluation value, a case where information related to the gradations on the high brightness side and the low brightness side is not well left in a case where the scene has a wide dynamic range and the histogram of the captured image is biased occurs.

The present invention is conceived in view of such matters. An object of the present invention is to provide an imaging apparatus, an imaging method, and a program that can leave information related to gradations on a high brightness side and a low brightness side as far as possible even in a case where a scene has a wide dynamic range and a histogram of a captured image is biased.

In order to achieve the object, an imaging apparatus according to one aspect of the present invention comprises an exposure setting unit that sets a first exposure or a second exposure, an image acquisition unit that acquires a captured image imaged at the first exposure, a brightness information acquisition unit that acquires information related to a brightness of each pixel constituting the captured image, a count unit that counts each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region based on the information related to the brightness, a calculation unit that calculates a first ratio between the number of darkened pixels and the number of low brightness pixels and a second ratio between the number of washed out pixels and the number of high brightness pixels, and an exposure adjustment unit that adjusts the first exposure to the second exposure based on the first ratio and the second ratio calculated by the calculation unit.

According to the present aspect, the exposure adjustment unit adjusts the exposure based on the first ratio between the number of darkened pixels and the number of low brightness pixels and the second ratio between the number of washed out pixels and the number of high brightness pixels. The first ratio represents the percentage of darkened pixels to the low brightness pixels, and the second ratio represents the percentage of washed out pixels to the high brightness pixels. By adjusting the exposure based on the first ratio and the second ratio, exposure control that leaves more information related to gradations on a high brightness side and a low brightness side than that in a case where the exposure is simply adjusted based on the number of darkened pixels and the number of washed out pixels can be performed.

It is preferable that the exposure adjustment unit determines a magnitude relationship between the first ratio and the second ratio, adjusts the first exposure to the second exposure acquired by increasing the first exposure by a predetermined amount of exposure in a case where the first ratio is higher than the second ratio, and adjusts the first exposure to the second exposure acquired by decreasing the first exposure by a predetermined amount of exposure in a case where the second ratio is higher than the first ratio.

According to the present aspect, the exposure adjustment unit performs adjustment of increasing the exposure in a case where the percentage of darkened pixels to the low brightness pixels is higher than the percentage of washed out pixels to the high brightness pixels, and performs adjustment of decreasing the exposure in a case where the percentage of washed out pixels to the high brightness pixels is higher than the percentage of darkened pixels to the low brightness pixels. Accordingly, in the present aspect, adjustment is performed based on the magnitude relationship between the percentage of darkened pixels to the low brightness pixels and the percentage of washed out pixels to the high brightness pixels. Thus, the information related to the gradations on the high brightness side and the low brightness side can be left as far as possible.

It is preferable that the exposure adjustment unit adjusts the first exposure to the second exposure acquired by increasing the first exposure by the predetermined amount of exposure in a case where the first ratio is higher than the second ratio and the first ratio is higher than a first threshold, and adjusts the first exposure to the second exposure acquired by decreasing the first exposure by the predetermined amount of exposure in a case where the second ratio is higher than the first ratio and the second ratio is higher than a second threshold.

According to the present aspect, in a case where the percentage of darkened pixels to the low brightness pixels is higher than the percentage of washed out pixels to the high brightness pixels and is higher than the first threshold, the exposure adjustment unit adjusts the exposure such that the percentage of darkened pixels is decreased by increasing the exposure. In addition, in a case where the percentage of washed out pixels to the high brightness pixels is higher than the percentage of darkened pixels to the low brightness pixels and is higher than the second threshold, the exposure adjustment unit adjusts the exposure such that the percentage of washed out pixels is decreased by decreasing the exposure. Accordingly, in the present aspect, in a case where the percentage of darkened pixels or the percentage of washed out pixels is high, the high percentage is corrected. Thus, the information related to the gradations on the high brightness side and the low brightness side can be left as far as possible.

It is preferable that the imaging apparatus further comprises a simulation unit that acquires information related to a brightness of each pixel constituting a predicted captured image predicted to be acquired in a case of imaging at the second exposure, counts the number of darkened pixels, the number of low brightness pixels, the number of washed out pixels, and the number of high brightness pixels based on the information related to the predicted brightness, and calculates a third ratio between the counted number of darkened pixels and the counted number of low brightness pixels and a fourth ratio between the counted number of washed out pixels and the counted number of high brightness pixels. It is preferable that the exposure adjustment unit adjusts the first exposure to the second exposure based on the fourth ratio calculated by the simulation unit in a case where the first ratio is higher than the second ratio, and adjusts the first exposure to the second exposure based on the third ratio calculated by the simulation unit in a case where the second ratio is higher than the first ratio.

According to the present aspect, by the simulation unit, brightness information related to the predicted captured image predicted to be imaged after the exposure is adjusted is acquired, and the number of darkened pixels, the number of low brightness pixels, the number of washed out pixels, and the number of high brightness pixels are counted based on the acquired brightness information. Furthermore, according to the present aspect, the percentage of darkened pixels to the low brightness pixels and the percentage of washed out pixels to the high brightness pixels in the predicted captured image are calculated based on the number of pixels counted by the simulation unit. The exposure adjustment unit of the present aspect performs the exposure control based on the ratio (fourth ratio) of the number of washed out pixels and the number of high brightness pixels in the predicted captured image in a case where the percentage of darkened pixels to the low brightness pixels is higher than the percentage of washed out pixels to the high brightness pixels, and performs the exposure control based on the ratio (third ratio) of the number of darkened pixels and the number of low brightness pixels in the predicted captured image in a case where the percentage of washed out pixels to the high brightness pixels is higher than the percentage of darkened pixels to the low brightness pixels. Accordingly, in the present aspect, the occurrence of hunting such as performing adjustment of decreasing the exposure immediately after adjustment of increasing the exposure or conversely, performing adjustment of increasing the exposure immediately after adjustment of decreasing the exposure can be prevented.

It is preferable that the exposure adjustment unit adjusts the first exposure to the second exposure acquired by decreasing the first exposure by the predetermined amount of exposure in a case where the third ratio is lower than or equal to a third threshold, and adjusts the first exposure to the second exposure acquired by increasing the first exposure by the predetermined amount of exposure in a case where the fourth ratio is lower than or equal to a fourth threshold.

According to the present aspect, by the exposure adjustment unit, the first exposure is adjusted to the second exposure acquired by decreasing the first exposure by the predetermined amount of exposure in a case where the ratio (third ratio) of the number of darkened pixels and the number of low brightness pixels in the predicted captured image is lower than or equal to the third threshold. In addition, according to the present aspect, by the exposure adjustment unit, the first exposure is adjusted to the second exposure acquired by increasing the first exposure by the predetermined amount of exposure in a case where the ratio (fourth ratio) of the number of washed out pixels and the number of high brightness pixels in the predicted captured image is lower than or equal to the fourth threshold. Accordingly, in the present aspect, the occurrence of hunting such as performing adjustment of decreasing the exposure immediately after adjustment of increasing the exposure or conversely, performing adjustment of increasing the exposure immediately after adjustment of decreasing the exposure can be more appropriately prevented.

It is preferable that the count unit performs weighting depending on a position in the captured image and counts the number of darkened pixels and the number of washed out pixels.

According to the present aspect, the count unit counts the number of darkened pixels and the number of washed out pixels weighted depending on the position in the captured image. Accordingly, in the present aspect, the exposure control can be performed using the count result from weighting the darkened pixel and the washed out pixel depending on the position in the captured image.

It is preferable that the count unit performs the weighting on the number of darkened pixels and the number of washed out pixels in a center region of the captured image, the number of darkened pixels and the number of washed out pixels in a region of a main subject in the captured image, or the number of darkened pixels and the number of washed out pixels in a region of the captured image in focus.

According to the present aspect, the count unit performs the weighting on the number of darkened pixels and the number of washed out pixels in the center region of the captured image, the number of darkened pixels and the number of washed out pixels in the region of the main subject in the captured image, or the number of darkened pixels and the number of washed out pixels in the region of the captured image in focus. Accordingly, in the present aspect, information related to the darkened pixel and the washed out pixel in an important region in the captured image is effectively used. Thus, the exposure in the important region in the captured image can be appropriately set.

It is preferable that the image acquisition unit acquires the captured image by a color image sensor, the brightness information acquisition unit acquires the brightness based on R, and B values of each pixel subjected to a demosaicing process based on an output value from the color image sensor, and the count unit determines the high brightness pixel based on the brightness and counts a pixel of which a maximum value of the R, G, and B values constituting the brightness of the determined high brightness pixel is higher than a fifth threshold as the washed out pixel.

According to the present aspect, the captured image is acquired by the image acquisition unit using the color image sensor. The brightness is acquired by the brightness information acquisition unit based on the R, G, and B values of each pixel subjected to the demosaicing process based on the output value from the color image sensor. In addition, according to the present aspect, by the count unit, the high brightness pixel is determined based on the brightness, and a pixel of which the maximum value of the R, G, and B values constituting the brightness of the determined high brightness pixel is higher than the fifth threshold is counted as the washed out pixel. Accordingly, in the present aspect, the count of washed out pixels is counted based on the maximum value of the R, G, and B values. Thus, the exposure control with reduced color saturation can be performed.

An imaging method according to another aspect of the present invention comprises an exposure setting step of setting a first exposure or a second exposure, an image acquisition step of acquiring a captured image imaged at the first exposure, a brightness information acquisition step of acquiring information related to a brightness of each pixel constituting the captured image, a count step of counting each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region, based on the information related to the brightness, a calculation step of calculating a first ratio between the number of darkened pixels and the number of low brightness pixels and a second ratio between the number of washed out pixels and the number of high brightness pixels, and an exposure adjustment step of adjusting the first exposure to the second exposure based on the first ratio and the second ratio calculated in the calculation step.

A program according to still another aspect of the present invention causes a computer to implement an exposure setting step of setting a first exposure or a second exposure, an image acquisition step of acquiring a captured image imaged at the first exposure, a brightness information acquisition step of acquiring information related to a brightness of each pixel constituting the captured image, a count step of counting each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region, based on the information related to the brightness, a calculation step of calculating a first ratio between the number of darkened pixels and the number of low brightness pixels and a second ratio between the number of washed out pixels and the number of high brightness pixels, and an exposure adjustment step of adjusting the first exposure to the second exposure based on the first ratio and the second ratio calculated in the calculation step.

According to the present invention, the exposure is adjusted based on the first ratio between the number of darkened pixels and the number of low brightness pixels and the second ratio between the number of washed out pixels and the number of high brightness pixels. Thus, the exposure control for leaving more information related to the gradations on the high brightness side and the low brightness side than that in a case where the exposure is simply adjusted based on the number of darkened pixels and the number of washed out pixels can be performed.

BRIEF DESCRIPTION OF THE DRAWINGS

FIG. 8 is a diagram conceptually illustrating one example of weighting a count of the number of pixels at positions in a captured image.

FIG. 9 is a diagram conceptually illustrating one example of weighting the count of the number of pixels at positions in the captured image.

DESCRIPTION OF THE PREFERRED EMBODIMENTS

Hereinafter, preferred embodiments of an imaging apparatus, an imaging method, and a program according to the embodiment of the present invention will be described in accordance with the appended drawings.

<Overall Configuration of Imaging Apparatus>

Figure 1:
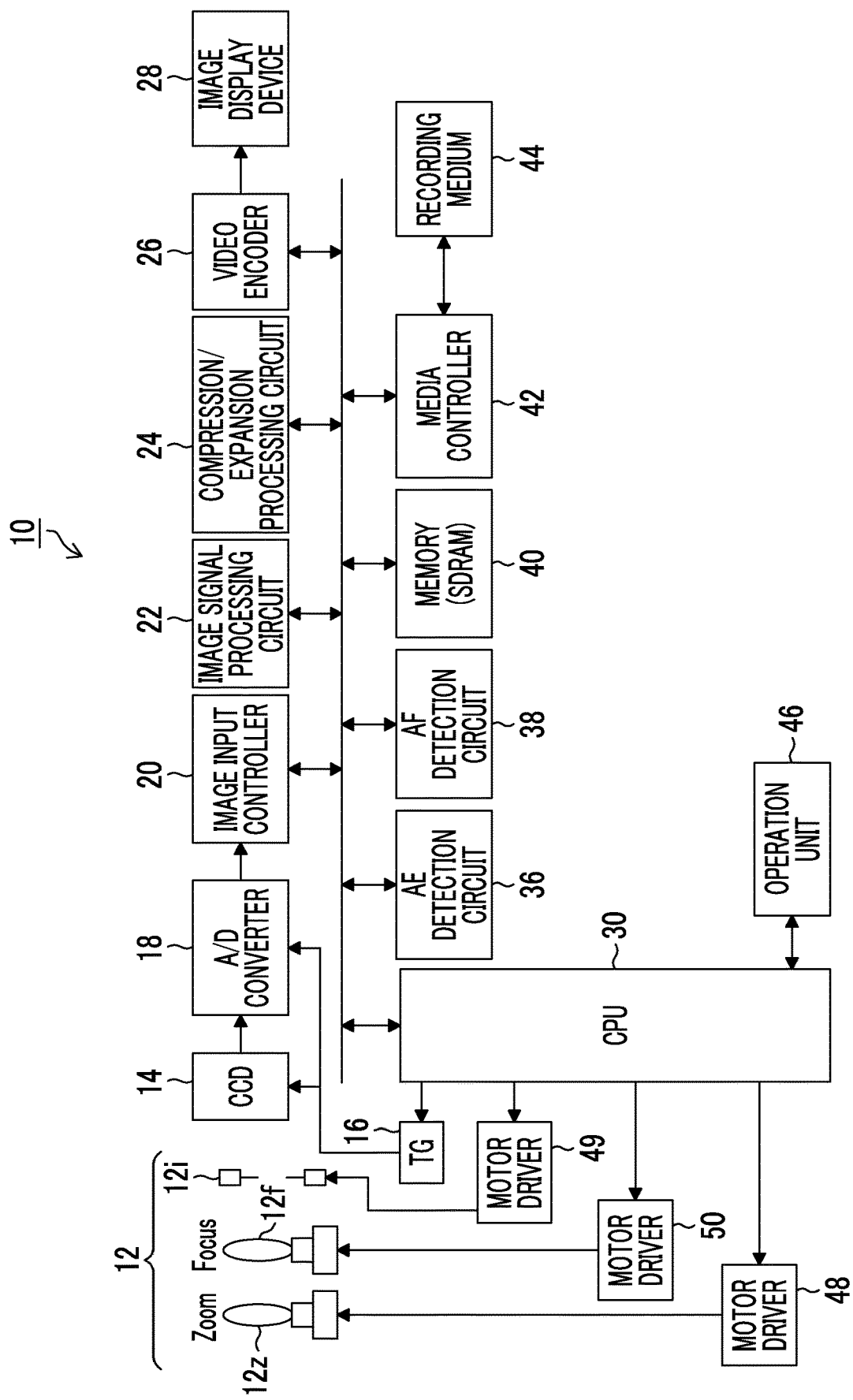
FIG. 1 is a block diagram illustrating a configuration example of an imaging apparatus.

FIG. 1 is a block diagram illustrating a configuration example of the imaging apparatus to which the embodiment of the present invention is applied. As illustrated in FIG. 1, an imaging apparatus 10 of the present embodiment is configured with an imaging optical system 12, a color image sensor 14 (hereinafter, referred to as a "charge coupled device (CCD)") including a solid-state imaging element such as a CCD, a timing generator (TG) 16, an analog/digital (A/D) converter 18, an image input controller 20, an image signal processing circuit 22, a compression/expansion processing circuit 24, a video encoder 26, an image display device 28, a central processing unit (CPU) 30, an automatic exposure (AE) detection circuit 36, an auto focus (AF) detection circuit 38, a memory (synchronous dynamic random access memory (SDRAM)) 40, a media controller 42, a recording medium 44, an operation unit 46, and the like.

An overall operation of the imaging apparatus 10 is managed and controlled by the CPU 30. That is, the CPU 30 controls each unit of the imaging apparatus 10 in accordance with a predetermined program based on an input from the operation unit 46. The CPU 30 loads the program into the memory 40 and executes various processes using the memory 40 as a work memory.

The imaging optical system 12 includes a zoom lens 12z, a focus lens 12f, and a stop (for example, an iris stop) 12i and is driven by an instruction from the CPU 30 through each of motor drivers 48, 49, and 50. That is, the zoom lens 12z is driven by the motor driver 48 and moves forward and backward on an imaging optical axis, thereby changing a focal length. The focus lens 12f is driven by the motor driver 50 and moves forward and backward on the imaging optical axis, thereby changing an imaging position. In addition, the stop 12i is driven by the motor driver 49, and the amount of opening of the stop 12i changes stepwise or continuously, thereby changing an F number.

The CCD (image acquisition unit) 14 is configured with a color CCD (color image sensor) in which red (R), green (G), and blue (B) filters are arranged (for example, G stripe and RIB checkerboard; Bayer arrangement) for each pixel. Light incident on a light reception surface of the CCD 14 through the imaging optical system 12 is converted into signal charges of an amount corresponding to an incident light intensity by each photodiode arranged on the light reception surface. The signal charges accumulated in each photodiode are read in accordance with a timing signal applied from the timing generator (TG) 16 and are sequentially output from the CCD 14 as a voltage signal (image signal).

The CCD 14 comprises a shutter gate and a shutter drain. The signal charges accumulated in each photodiode can be swept out to the shutter drain by applying a shutter gate pulse to the shutter gate. The CPU 30 controls a charge accumulation time (shutter speed) for the signal charges accumulated in each photodiode by controlling the application of the shutter gate pulse to the shutter gate through the TG 16 (so-called electronic shutter function).

The image signal sequentially output from the CCD 14 is converted into a digital image signal by the A/D converter 18 and is temporarily stored in the memory 40 through the image input controller 20.

The image signal processing circuit 22 includes a white balance correction circuit, a gamma correction circuit, a contour correction circuit, a brightness and color difference signal generation circuit, and the like. The image signal processing circuit 22 processes the image signal stored in the memory 40 in accordance with an instruction from the CPU 30 and generates a YCbCr signal or a YUV signal including a brightness signal and a color difference signal.

In the case of displaying a through-movie image (live view image) on the image display device 28, images are consecutively captured by the CCD 14, and the YUV signal is generated by consecutively processing the acquired image signals. The generated YUV signal is applied to the video encoder 26 through the memory 40 and is converted into a signal format for display and output to the image display device 28. Accordingly, the through-movie image is displayed on the image display device 28.

In the case of recording an image, an image is captured by the CCD 14 in response to an imaging instruction from the operation unit 46, and the YUV signal is generated by processing the acquired image signal. The generated YUV signal is applied to the compression/expansion processing circuit 24 and processed into predetermined compressed image data and then, is stored in the recording medium 44 through the media controller 42.

The compressed image data stored in the recording medium 44 is read from the recording medium 44 in response to a reproduction instruction and processed into a non-compressed YUV signal by the compression/expansion processing circuit 24 and then, is output to the image display device 28 through the video encoder 26. Accordingly, the image recorded on the recording medium 44 is reproduced and displayed on the image display device 28.

The AE detection circuit 36 calculates a physical quantity necessary for AE control from the input image signal in accordance with an instruction from the CPU 30. For example, as the physical quantity necessary for the AE control, the AE detection circuit 36 calculates the accumulation value of the image signal of R, G, and B for each divided area. The CPU 30 obtains an appropriate exposure value (EV value) by detecting the brightness of the subject based on the accumulation value obtained from the AE detection circuit 36, and performs exposure control based on the obtained EV value. The exposure control will be described in detail below.

The AF detection circuit 38 calculates a physical quantity necessary for AF control from the input image signal in accordance with an instruction from the CPU 30. In the imaging apparatus 10 of the present embodiment, the AF control is performed based on the contrast of the image. The AF detection circuit 38 calculates a focus evaluation value indicating the sharpness of the image from the input image signal. The CPU 30 controls the movement of the focus lens 12f through the motor driver 50 such that the focus evaluation value calculated by the AF detection circuit 38 is maximized.

The imaging apparatus 10 of the present embodiment is configured as follows.

First Embodiment

Next, a first embodiment of the present invention will be described.

Figure 2:
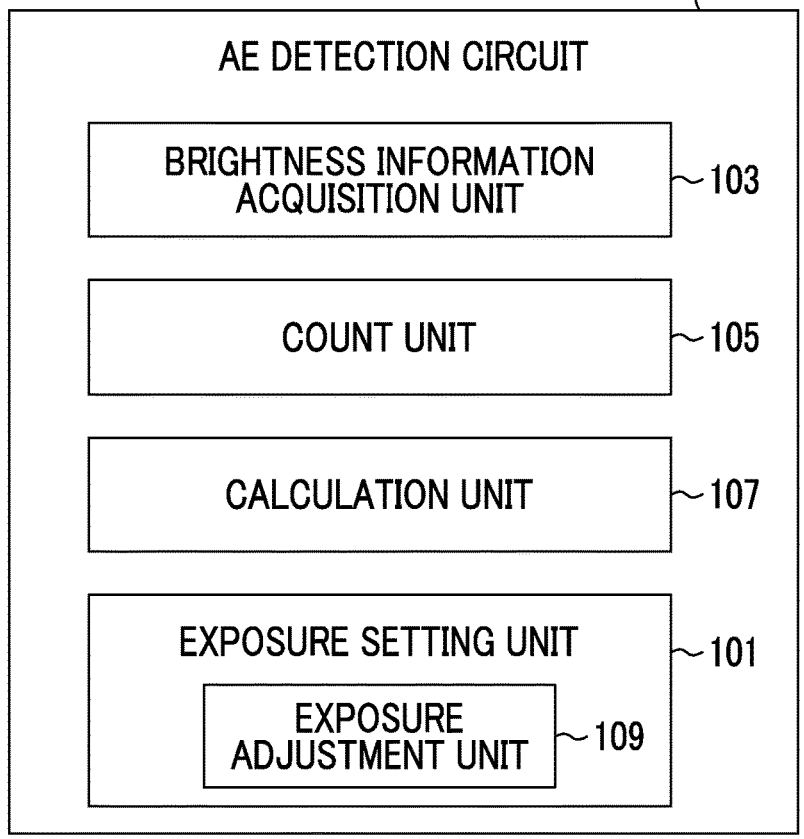
FIG. 2 is a block diagram illustrating a functional configuration example of an AE detection circuit.

FIG. 2 is a block diagram illustrating a functional configuration example of the AE detection circuit 36 of the present embodiment. The AE detection circuit 36 is configured with an exposure setting unit 101, a brightness information acquisition unit 103, a count unit 105, a calculation unit 107, and an exposure adjustment unit 109.

The brightness information acquisition unit 103 acquires information related to the brightness of each pixel constituting the captured image. The information related to the brightness is the brightness or information relevant to the brightness. For example, the value of Y calculated based on Expression (1) below in the image signal processing circuit 22 is used as the brightness.

$$Y = 0.3R + 0.6G + 0.1B \quad (1)$$

In Expression (1), R, G, and B are output values, and values after performing a demosaicing process (demosaicing) on the output values from the color image sensor (CCD 14) are used. The demosaicing process is a process of calculating all color information for each pixel from a mosaic image corresponding to a color filter array of the single-plate color image sensor (CCD 14). The demosaicing process is also referred to as demosaicing. For example, in the case of the CCD 14 including color filters of three colors of R, G, and B, the demosaicing process is a process of calculating color information for all of R, G, and B for each pixel from a mosaic image including R, G, and B. In the present example, the demosaicing process is performed by the image signal processing circuit 22.

In addition, for example, the output value of the G signal is used as the information related to the brightness. As illustrated in Expression (1), since the output value of the G signal most contributes to the brightness, the output value of the G signal may be used as the information related to the brightness.

Figure 3:
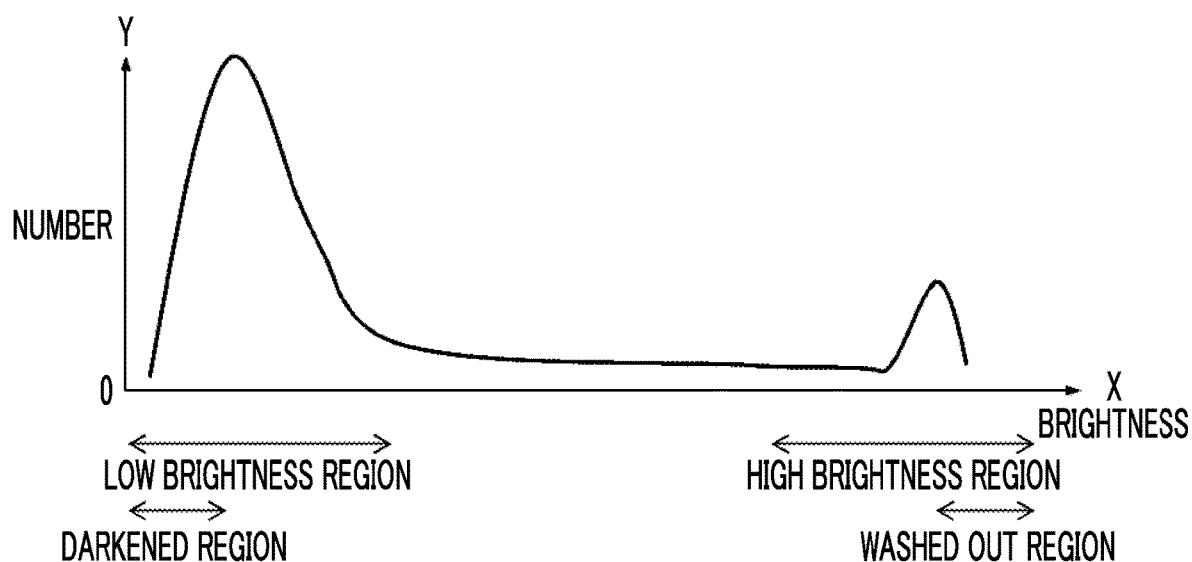
FIG. 3 is a diagram illustrating a brightness histogram.

FIG. 3 illustrates the information related to the brightness of each pixel constituting the captured image and acquired by the brightness information acquisition unit 103, and is a diagram illustrating a so-called brightness histogram.

In FIG. 3, a Y axis denotes the number (frequency) of pixels, and an X axis denotes the brightness. A low brightness region and a high brightness region refer to a region on a low brightness side and a region on a high brightness side in all pixels constituting the captured image. For example, the lowest brightness side (low brightness side of ¼) in a case where a brightness region of all pixels of the captured image is divided into four is the low brightness region. The highest brightness side (high brightness side of ¼) in a case where the brightness region of all pixels of the captured image is divided into four is the high brightness region.

Furthermore, a darkened region is a region inside the low brightness region and is a region having a brightness lower than a predetermined brightness. For example, the darkened region is a region on the lowest brightness side (low brightness side of ¼ in the low brightness region) in a case where the low brightness region is divided into four. In addition, a washed out region is a region inside the high brightness region and is a region having a brightness higher than a predetermined brightness. For example, the washed out region is a region on the highest brightness side (high brightness side of ¼ in the high brightness region) in a case where the high brightness region is divided into four. In the present application, a pixel included in the darkened region is referred to as a darkened pixel, and a pixel included in the washed out region is referred to as a washed out pixel. In addition, in the present application, a pixel included in the low brightness region is referred to as a low brightness pixel, and a pixel included in the high brightness region is referred to as a high brightness pixel.

Returning to FIG. 2, the count unit 105 counts each of the number of darkened pixels, the number of low brightness pixels, the number of washed out pixels, and the number of high brightness pixels. The count unit 105 may count one pixel as one or may perform counting by weighting the pixel depending on the position of the pixel in the captured image. A case where the count unit 105 weights the pixel will be described below.

The calculation unit 107 calculates the percentage (first ratio) of darkened pixels to the number of low brightness pixels and the percentage (second ratio) of washed out pixels to the number of high brightness pixels based on the count result of the count unit 105. The calculation unit 107 transmits the calculation result to the exposure adjustment unit 109.

The exposure setting unit 101 sets an exposure in a case where the captured image is imaged by the imaging apparatus 10. The exposure setting unit 101 first sets the exposure based on a well-known technology. For example, the setting of the exposure based on the well-known technology is a process of calculating an exposure control amount by a general process from the related art. Specifically, the exposure control is performed based on the information or the like related to the brightness and acquired from the signal of the captured image of the whole screen. In addition, the exposure setting unit 101 transmits the setting of the exposure set by the well-known technology as described above and the exposure adjusted by the exposure adjustment unit 109 as described below to the CPU 30. The CPU 30 that receives the setting of the exposure performs the exposure control by controlling the stop 12i, the shutter speed of a shutter, not illustrated, and the sensitivity of the CCD 14. In the present application, the exposure before performing exposure adjustment according to the embodiment of the present invention is referred to as a first exposure, and the exposure after performing the exposure adjustment according to the embodiment of the present invention is referred to as a second exposure.

In addition, the exposure setting unit 101 includes the exposure adjustment unit 109. The exposure adjustment unit 109 adjusts the current setting of the exposure to the exposure after adjustment based on the percentage of darkened pixels and the percentage of washed out pixels calculated by the calculation unit 107 described below. The exposure adjusted by the exposure adjustment unit 109 is set by the exposure setting unit 101. The imaging apparatus 10 performs imaging based on the adjusted exposure. In the case of adjusting the exposure, the exposure adjustment unit 109 performs adjustment by increasing the exposure or decreasing the exposure. In the case of increasing by a predetermined amount of exposure, for example, the exposure adjustment unit 109 can set an exposure of up to +3 Ev for each ⅓ Ev as a predetermined exposure. In the case of decreasing by a predetermined amount of exposure, for example, the exposure adjustment unit 109 can set an exposure of up to −3 Ev for each ⅓ Ev as a predetermined exposure.

In addition, the exposure adjustment unit 109 determines a magnitude relationship between the percentage of darkened pixels and the percentage of washed out pixels. The exposure adjustment unit 109 performs adjustment of increasing the exposure in a case where the percentage of darkened pixels is higher, and performs adjustment of decreasing the exposure in a case where the percentage of washed out pixels is higher than the percentage of darkened pixels. In a case where the percentage of darkened pixels is equal to the percentage of washed out pixels, the exposure adjustment unit 109 may not adjust the exposure.

In a case where the percentage of darkened pixels is higher than the percentage of washed out pixels, and the percentage of darkened pixels is higher than a darkened pixel percentage threshold (first threshold), the exposure adjustment unit 109 performs adjustment of increasing the exposure. In a case where the percentage of washed out pixels in the high brightness region is higher than the darkened pixels in the low brightness region, and the percentage of washed out pixels is higher than a washed out pixel percentage threshold (second threshold), the exposure adjustment unit 109 performs adjustment of decreasing the exposure. For example, the darkened pixel percentage threshold is ½, and the washed out pixel percentage threshold is ½.

Figure 4:
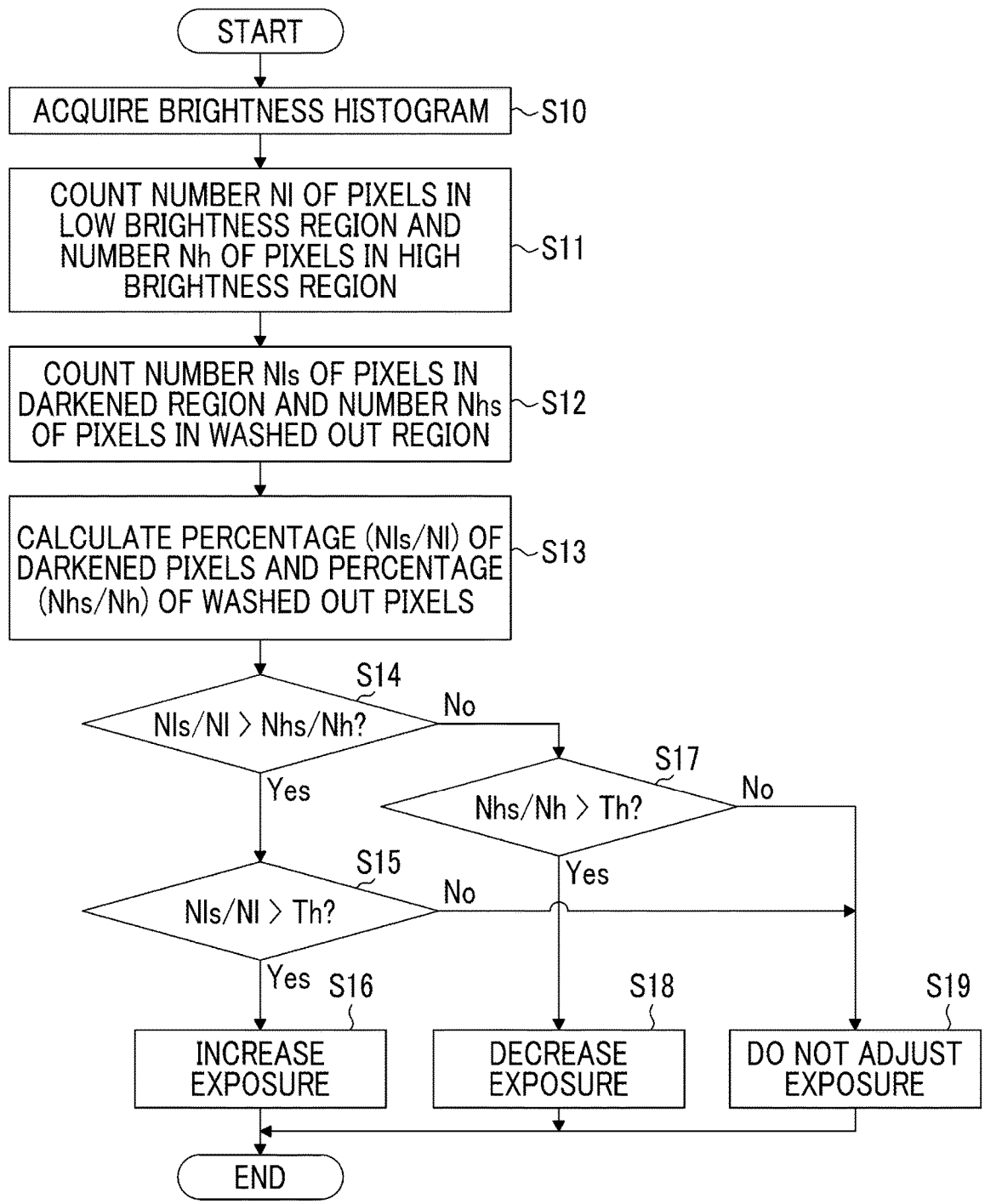
FIG. 4 is a diagram illustrating an operation flow of exposure adjustment.

FIG. 4 is a diagram illustrating an operation flow of the exposure adjustment of the first embodiment.

First, the exposure setting unit 101 sets the exposure controlled by well-known exposure control, and a live view image is imaged (an exposure setting step and an image acquisition step). Next, the brightness information acquisition unit 103 acquires a brightness histogram generated based on the live view image imaged and output by the CCD 14 (step S10: brightness information acquisition step). The live view image is imaged based on the exposure before adjustment. Next, the count unit 105 counts the number Nl of pixels in the low brightness region (number of low brightness pixels) and the number Nh of pixels in the high brightness region (number of high brightness pixels) based on the histogram (step S11: count step). Then, the count unit 105 counts the number Nls of pixels in the darkened region (number of darkened pixels) and the number Nhs of pixels in the washed out region (number of washed out pixels) (step S12: count step).

Next, the calculation unit 107 calculates the percentage (Nls/Nl) of darkened pixels using the number Nl of low brightness pixels and the number Nls of pixels in the darkened region, and calculates the percentage (Nhs/Nh) of washed out pixels using the number Nh of pixels in the high brightness region and the number Nhs of pixels in the washed out region (step S13: calculation step).

The exposure adjustment unit 109 compares the percentage of darkened pixels with the percentage of washed out pixels (step S14), and in a case where the percentage of darkened pixels is higher than the percentage of washed out pixels, determines whether or not the percentage of darkened pixels is higher than a darkened pixel percentage threshold Th (step S15). In a case where the percentage of darkened pixels is higher than the darkened pixel percentage threshold Th, the exposure adjustment unit 109 performs adjustment of increasing the current exposure by the predetermined amount of exposure (step S16). In a case where the percentage of darkened pixels is lower than the darkened pixel percentage threshold Th, the exposure adjustment unit 109 does not change the current exposure (step S19).

Furthermore, the exposure adjustment unit 109 compares the percentage of darkened pixels with the percentage of washed out pixels (step S14), and in a case where the percentage of darkened pixels is lower than or equal to the percentage of washed out pixels, determines whether or not the percentage of washed out pixels is higher than the washed out pixel percentage threshold Th (step S17). In a case where the percentage of washed out pixels is higher than the washed out pixel percentage threshold Th, the exposure adjustment unit 109 performs adjustment of decreasing the current exposure by the predetermined amount of exposure (step S18). In a case where the percentage of washed out pixels is lower than the washed out pixel percentage threshold Th, the exposure adjustment unit 109 does not change the current exposure (step S19). Step S16, step S18 and step S19 correspond to an exposure adjustment step.

Each configuration and each function described above can be appropriately implemented by any hardware, software, or a combination of both hardware and software. For example, the present invention can also be applied to a program that causes a computer to execute the process steps (process procedure) described above, a computer-readable recording medium (non-transitory recording medium) on which the program is recorded, or a computer on which the program can be installed.

As described thus far, in the present embodiment, by performing the exposure adjustment based on the percentage of darkened pixels to the number of low brightness pixels and the percentage of washed out pixels to the number of high brightness pixels, more information related to gradations on the high brightness side and the low brightness side can be left than that in the case of simply performing the exposure adjustment based on the number of darkened pixels and the number of washed out pixels.

Second Embodiment

Next, a second embodiment of the present invention will be described.

Figure 5:
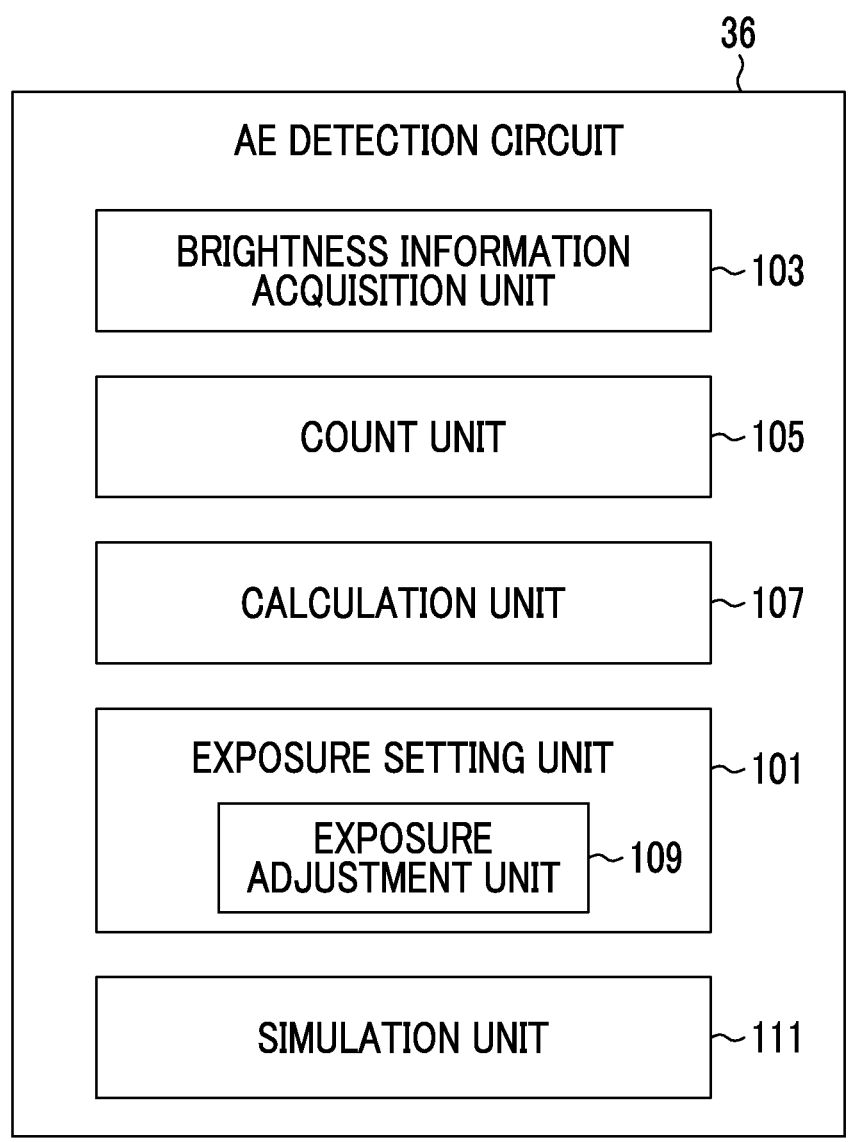
FIG. 5 is a block diagram illustrating a functional configuration example of the AE detection circuit.

FIG. 5 is a block diagram illustrating a functional configuration example of the AE detection circuit 36 of the present embodiment. The AE detection circuit 36 is configured with the exposure setting unit 101, the brightness information acquisition unit 103, the count unit 105, the calculation unit 107, the exposure adjustment unit 109, and a simulation unit 111. Parts already described in FIG. 2 will be designated by the same reference numbers, and descriptions of such parts will not be repeated.

The simulation unit 111 calculates the percentage of darkened pixels (percentage of predicted darkened pixels: third ratio) and the percentage of washed out pixels (percentage of predicted washed out pixels: fourth ratio) in a case where the captured image is unaged based on the exposure adjusted by the exposure adjustment unit 109.

Figure 6:
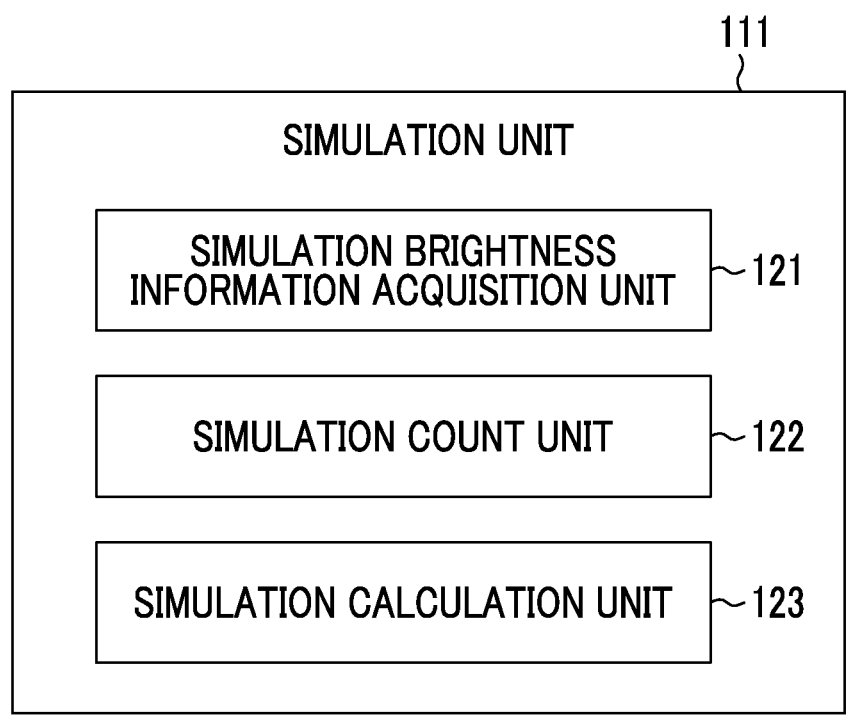
FIG. 6 is a block diagram illustrating a functional configuration example of a simulation unit.

FIG. 6 is a block diagram illustrating a functional configuration example of the simulation unit 111. The simulation unit 111 is configured with a simulation brightness information acquisition unit 121, a simulation count unit 122, and a simulation calculation unit 123.

The simulation brightness information acquisition unit 121 generates and acquires information related to the brightness of each pixel constituting a predicted captured image that is predicted to be acquired in a case where imaging is performed based on the exposure after adjustment. The simulation brightness information acquisition unit 121 transmits the acquired information related to the brightness to the simulation count unit 122. The simulation brightness information acquisition unit 121 generates information related to the brightness of the predicted captured image based on a well-known technology.

The simulation count unit 122 counts the number of predicted darkened pixels, the number of predicted low brightness pixels, the number of predicted washed out pixels, and the number of predicted high brightness pixels based on the information related to the brightness and acquired from the simulation brightness information acquisition unit 121. The simulation count unit 122 transmits the count result to the simulation calculation unit 123. In the same manner as the darkened pixel, the low brightness pixel, the washed out pixel, and the high brightness pixel described above, the predicted darkened pixel, the predicted low brightness pixel, the predicted washed out pixel, and the predicted high brightness pixel refer to pixels included in the darkened region, the low brightness region, the washed out region, and the high brightness region, respectively.

The simulation calculation unit 123 calculates the percentage of predicted darkened pixels that is the ratio between the number of predicted darkened pixels and the number of predicted low brightness pixels received from the simulation count unit 122. Furthermore, the simulation calculation unit 123 calculates the percentage of predicted washed out pixels that is the ratio between the number of predicted washed out pixels and the number of predicted high brightness pixels received from the simulation count unit 122.

Returning to FIG. 5, in a case where the percentage of darkened pixels is higher than the percentage of washed out pixels, the exposure adjustment unit 109 adjusts the exposure depending on the percentage of predicted washed out pixels to the number of predicted high brightness pixels calculated by the simulation calculation unit 123. In addition, in a case where the percentage of washed out pixels is higher than the percentage of darkened pixels, the exposure adjustment unit 109 adjusts the exposure depending on the percentage of predicted darkened pixels to the number of predicted low brightness pixels calculated by the simulation calculation unit 123.

In addition, in a case where the percentage of predicted darkened pixels is lower than or equal to a predicted darkened pixel percentage threshold (third threshold), the exposure adjustment unit 109 adjusts the exposure by decreasing the exposure by the predetermined amount of exposure. In addition, in a case where the percentage of predicted washed out pixels is higher than a predicted washed out pixel percentage threshold (fourth threshold), the exposure adjustment unit 109 adjusts the exposure by increasing the exposure by the predetermined amount of exposure. For example, the predicted darkened pixel percentage threshold is ½, and the predicted washed out pixel percentage threshold is ½. The darkened pixel percentage threshold, the washed out pixel percentage threshold, the predicted darkened pixel percentage threshold, and the predicted washed out pixel percentage threshold described above may be equal to each other or may be different from each other.

Figure 7:
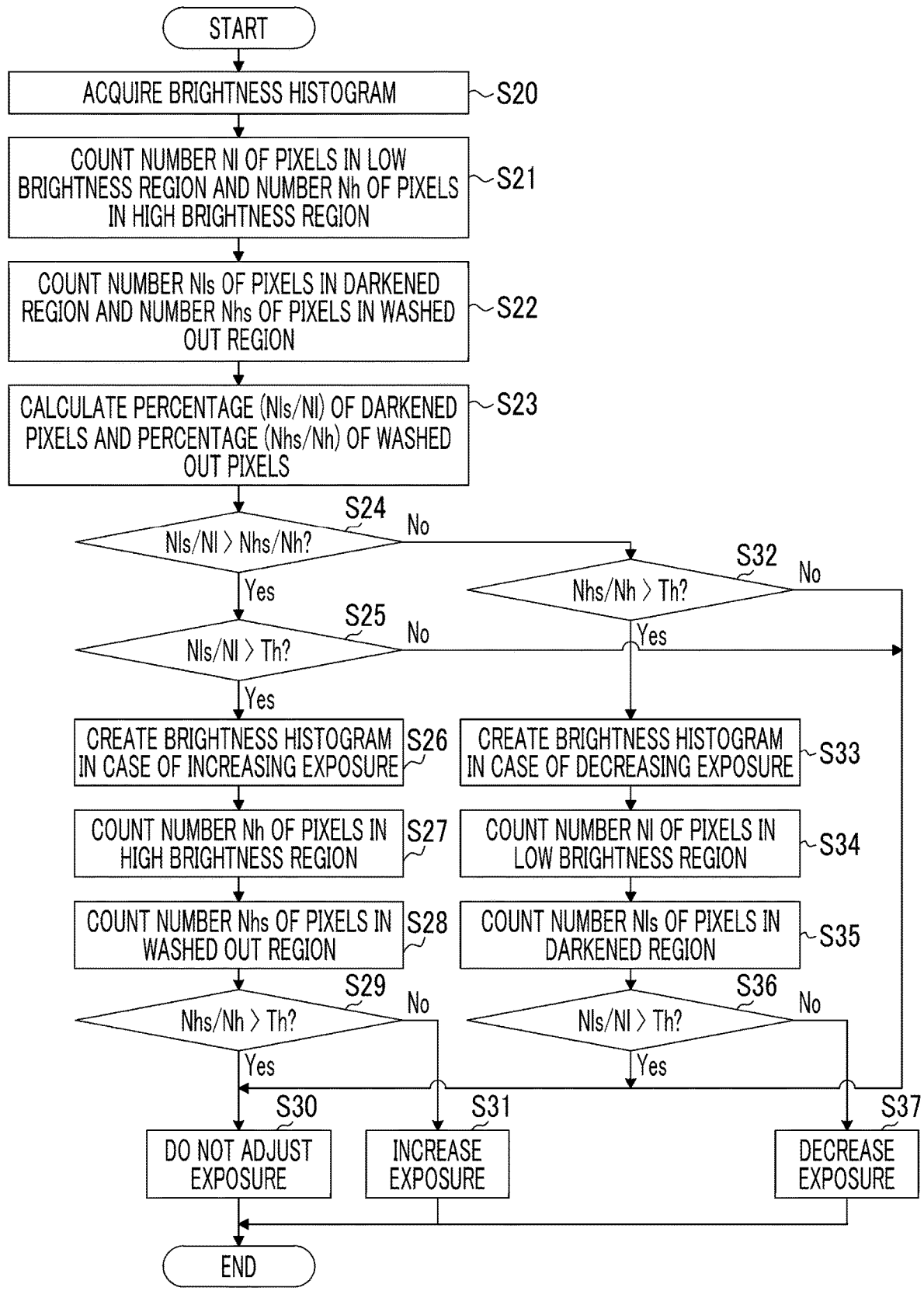
FIG. 7 is a diagram illustrating an operation flow of exposure adjustment.

FIG. 7 is a diagram illustrating an operation flow of the exposure adjustment of the present embodiment.

First, the brightness information acquisition unit 103 acquires the brightness histogram generated based on the live view image imaged and output by the CCD 14 (step S20). Next, the count unit 105 counts the number Nl of pixels in the low brightness region (low brightness pixels) and the number Nh of pixels in the high brightness region (high brightness pixels) (step S21) and counts the number Nls of pixels in the darkened region and the number Nhs of pixels in the washed out region (step S22).

Then, the calculation unit 107 calculates the percentage (Nls/Nl) of darkened pixels using the number Nl of low brightness region (number of low brightness pixels) and the number Nls of pixels in the darkened region (number of darkened pixels), and calculates the percentage (Nhs/Nh) of washed out pixels using the number Nh of pixels in the high brightness region (number of high brightness pixels) and the number Nhs of pixels in the washed out region (number of washed out pixels) (step S23).

The exposure adjustment unit 109 compares the percentage of darkened pixels with the percentage of washed out pixels (step S24), and in a case where the percentage of darkened pixels is higher than the percentage of washed out pixels, determines whether or not the percentage of darkened pixels is higher than the darkened pixel percentage threshold Th (step S25).

Then, in a case where the percentage of darkened pixels is higher than the darkened pixel percentage threshold Th, the simulation brightness information acquisition unit 121 creates the brightness histogram in the case of increasing the exposure by the predetermined amount (step S26). The simulation count unit 122 counts the number Nh of pixels in a predicted high brightness region and the number Nhs of pixels in a predicted washed out region (step S27 and step S28). The exposure adjustment unit 109 compares the percentage of predicted washed out pixels with the predicted washout threshold (step S29), and in a case where the percentage of predicted washed out pixels is higher than the predicted washout threshold, does not adjust the exposure (step S30). The exposure adjustment unit 109 compares the percentage of predicted washed out pixels with the predicted washout threshold. In a case where the percentage of predicted washed out pixels is lower than or equal to the predicted washout threshold, hunting is not caused even in a case where the exposure is increased. Thus, the exposure adjustment unit 109 performs adjustment of increasing the exposure by the predetermined amount (step S31).

In a case where the percentage of darkened pixels is lower than or equal to the darkened pixel percentage threshold (step S25), the exposure adjustment unit 109 does not adjust the exposure.

The exposure adjustment unit 109 compares the percentage of darkened pixels with the percentage of washed out pixels (step S24), and in a case where the percentage of darkened pixels is lower than or equal to the percentage of washed out pixels, determines whether or not the percentage of washed out pixels is higher than the washed out pixel percentage threshold Th (step S32).

Then, in a case where the percentage of darkened pixels is lower than or equal to the darkened pixel percentage threshold Th, the simulation brightness information acquisition unit 121 creates the brightness histogram in the case of decreasing the exposure by the predetermined amount (step S33). The simulation count unit 122 counts the number Nl of pixels in a predicted low brightness region and the number Nls of pixels in a predicted darkened region (step S34 and step S35). The exposure adjustment unit 109 compares the percentage of predicted darkened pixels with the predicted darkening threshold (step S36), and in a case where the percentage of predicted darkened pixels is higher than the predicted darkening threshold, does not adjust the exposure (step S30). The exposure adjustment unit 109 compares the percentage of predicted washed out pixels with the predicted washout threshold (fourth threshold). In a case where the percentage of predicted washed out pixels is lower than or equal to the predicted washout threshold, the occurrence of hunting is reduced even in a case where the exposure is decreased. Thus, the exposure adjustment unit 109 performs adjustment of decreasing the exposure by the predetermined amount (step S37). The operation flow illustrated in FIG. 7 may be repeatedly performed. That is, after the adjustment of increasing the exposure (step S31) or decreasing the exposure (step S37) is performed, the amount of adjustment of the exposure may be changed, and the exposure control may be performed again. For example, the operation of exposure adjustment illustrated in FIG. 7 may be performed until the percentage of darkened pixels becomes almost equal to the percentage of washed out pixels.

As described thus far, in the present embodiment, the exposure adjustment unit 109 adjusts the exposure using the calculation result of the percentage of predicted darkened pixels or the percentage of predicted washed out pixels based on the predicted output value of the simulation unit 111. Thus, the occurrence of hunting is reduced.

Third Embodiment

Next, a third embodiment of the present invention will be described. The count unit 105 of the present embodiment performs weighting depending on the position of the pixel in the captured image and counts the number of darkened pixels and the number of washed out pixels.

Figures 8, 9:
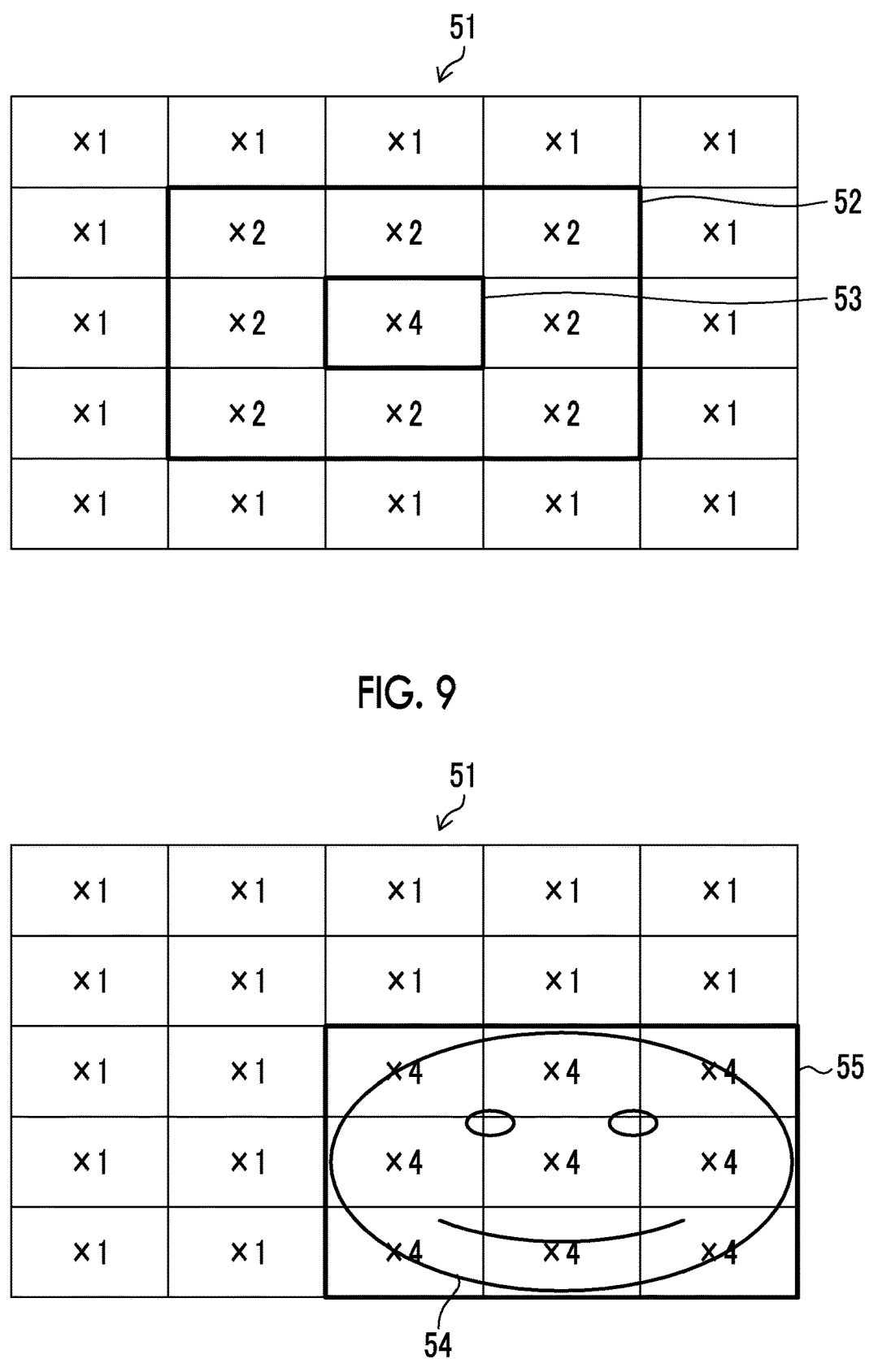

FIG. 8 is a diagram conceptually illustrating one example of weighting the count of the number of pixels at positions in a captured image 51. In the case illustrated in FIG. 8, the count unit 105 performs counting by weighting the darkened pixel and the washed out pixel in a center region 53 of the captured image 51.

The whole region of the captured image 51 is divided into 5×5=25 regions. The count unit 105 counts the number of darkened pixels and the number of washed out pixels included in the center region 53 four times. In addition, the count unit 105 counts the number of darkened pixels and the number of washed out pixels included in a semi-center region 52 twice. By performing counting by weighting the darkened pixel and the washed out pixel positioned in the center region 53 and/or the semi-center region 52 of the captured image 51, the exposure control corresponding to the subject positioned at the center of the captured image 51 can be performed.

FIG. 9 is a diagram conceptually illustrating one example of weighting the count of the number of pixels at positions in the captured image 51. In the case illustrated in FIG. 9, the count unit 105 performs counting by weighting the darkened pixel and the washed out pixel in the region of a main subject 54 in the captured image 51.

In the captured image 51, the darkened pixel and the washed out pixel in a main subject region 55 that is the region where the main subject 54 is positioned are counted four times. By performing counting by weighting the darkened pixel and the washed out pixel positioned in the main subject region 55 of the captured image 51, the exposure control corresponding to the main subject 54 of the captured image 51 can be performed.

Figure 10:
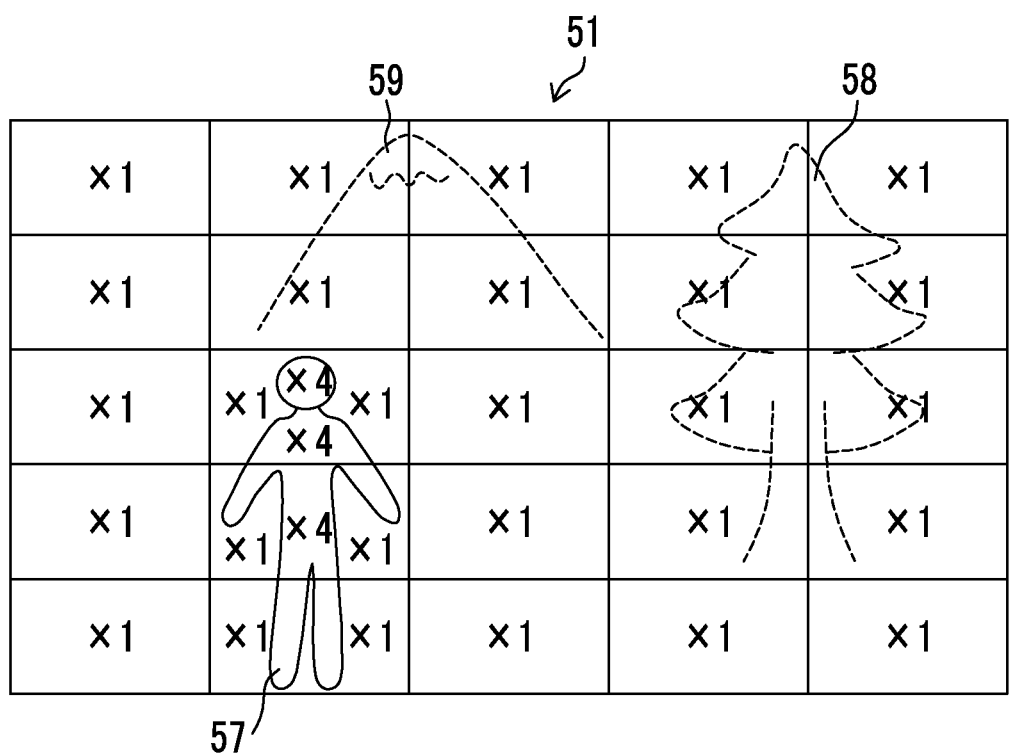
FIG. 10 is a diagram conceptually illustrating one example of weighting the count of the number of pixels at positions in the captured image.

FIG. 10 is a diagram conceptually illustrating one example of weighting the count of the number of pixels at positions in the captured image 51. In the case illustrated in FIG. 10, the count unit 105 performs counting by weighting the darkened pixel and the washed out pixel in a region of the captured image 51 where the focus is set.

In the captured image 51, a person 57 is in focus, and a tree 58 and a mountain 59 are out of focus (illustrated by dotted lines in FIG. 10). The darkened pixel and the washed out pixel constituting the person 57 in focus are counted four times. The darkened pixel and the washed out pixel constituting the other region out of focus are counted once. By performing counting by weighting the darkened pixel and the washed out pixel in the region of the captured image 51 where the focus is set, the exposure control corresponding to the subject in focus can be performed.

Fourth Embodiment

Next, a fourth embodiment of the present invention will be described. The count unit 105 of the present embodiment determines the high brightness pixel based on the brightness and counts a pixel of which the maximum value of the R, G and B values constituting the brightness of the determined high brightness pixel is higher than a washout threshold (fifth threshold) as the washed out pixel. For example, the washout threshold is a brightness of 1/16 from the high brightness side in a case where the whole range of the brightness is 1.

As described above, the brightness Y is obtained by Expression (1). Thus, the contribution of RGB to the brightness is not the same. Accordingly, for example, even in a case where the value of the B component is close to saturation, the B component is counted as a pixel not falling in the washed out region in terms of brightness when the values of R and G are lower than B. Thus, a determination may not be made in a direction of decreasing the exposure. Then, since the exposure control is not appropriately performed, a problem arises in that the B component is saturated, and color is changed. Therefore, in the present embodiment, the count unit 105 employs a method of detecting the counts of the low brightness pixel, the darkened pixel, the high brightness pixel, and the washed out pixel for each pixel.

As described above, the CCD 14 is a color image sensor (CCD 14) and acquires the captured image. The brightness information acquisition unit 103 acquires the brightness Y using Expression (1) described above based on the R, G, and B values of each pixel subjected to the demosaicing process based on the output values from the color image sensor (CCD 14).

Figure 11:
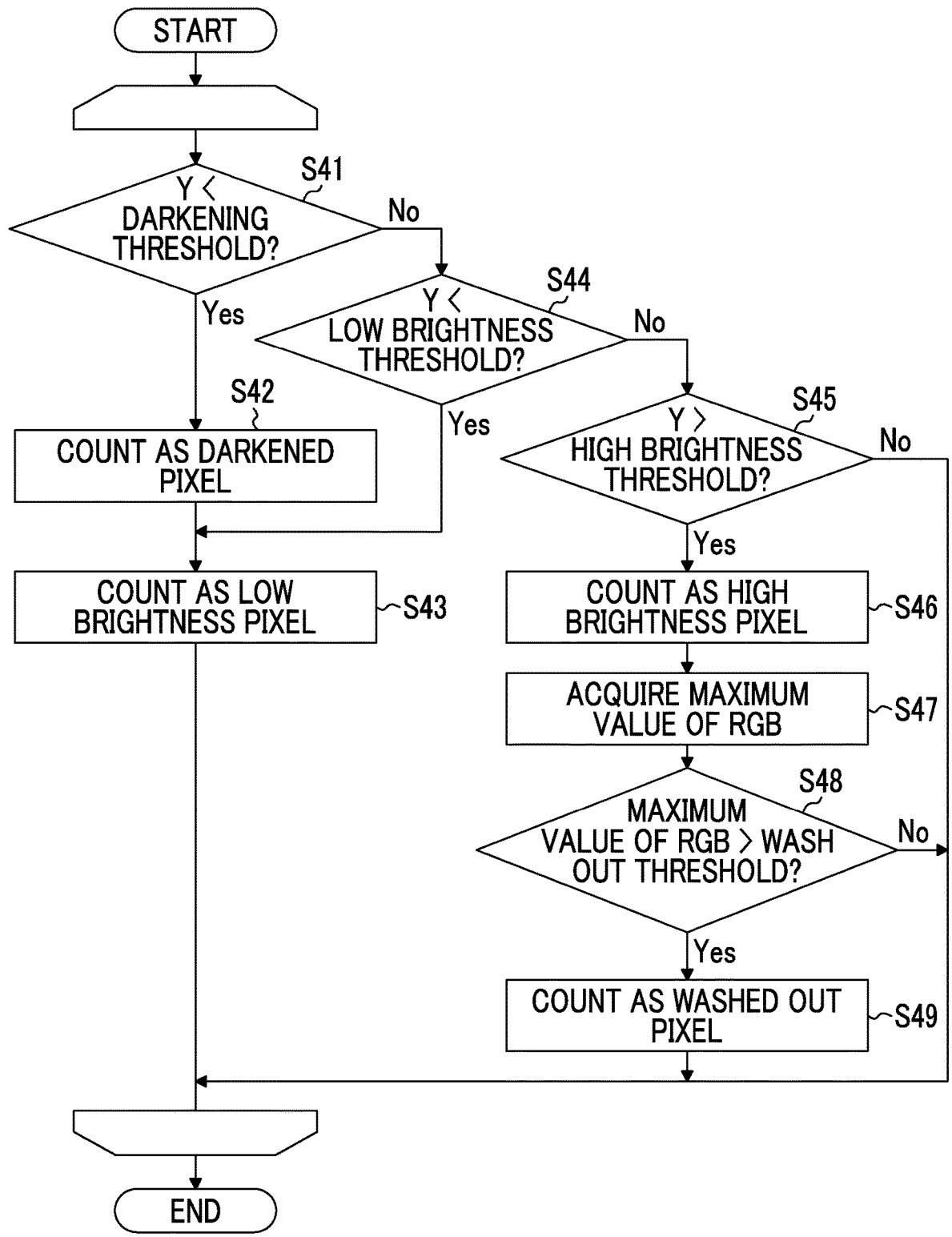
FIG. 11 is a diagram illustrating an operation flow in a case where a count unit counts each pixel.

FIG. 11 is a diagram illustrating an operation flow in a case where the count unit 105 in the imaging apparatus 10 of the present embodiment counts each pixel. That is, the count unit 105 performs counting for each pixel constituting the captured image in accordance with the operation flow illustrated in FIG. 11.

First, the count unit 105 determines whether or not the brightness Y of the pixel is lower than a darkening threshold (step S41). In a case where the brightness Y is lower than the darkening threshold, the count unit 105 counts the pixel as the darkened pixel (step S42) and counts the pixel as the low brightness pixel (step S43).

In a case where the brightness Y is higher than or equal to the darkening threshold, the count unit 105 determines whether or not the brightness Y is lower than a low brightness threshold (step S44). In a case where the brightness Y is lower than the low brightness threshold, the count unit 105 counts the pixel as the low brightness pixel.

In addition, in a case where the brightness Y is higher than or equal to the low brightness threshold, the count unit 105 determines whether or not the brightness Y is higher than a high brightness threshold (step S45). In a case where the brightness Y is lower than or equal to the high brightness threshold, the count unit 105 does not perform counting. In a case where the brightness Y is higher than the high brightness threshold, the count unit 105 counts the pixel as the high brightness pixel (step S46). Then, the count unit 105 acquires the maximum value of the R, G, and B values constituting the brightness Y (step S47). Next, the count unit 105 determines whether or not the maximum value of the R, G, and B values is higher than the washout threshold (step S48). In a case where the maximum value is higher than the washout threshold, the count unit 105 counts the pixel as the washed out pixel (step S49). In a case where the maximum value is lower than or equal to the washout threshold, the count unit 105 does not count the pixel as the washed out pixel.

As described thus far, by causing the count unit 105 to determine the pixel in the washed out region based on the maximum value of R, G, and B constituting the brightness Y, the exposure control with reduced color saturation can be performed.

<Configuration Example of Smartphone>

A case where the present invention is applied to a smartphone will be described.

Figure 12:
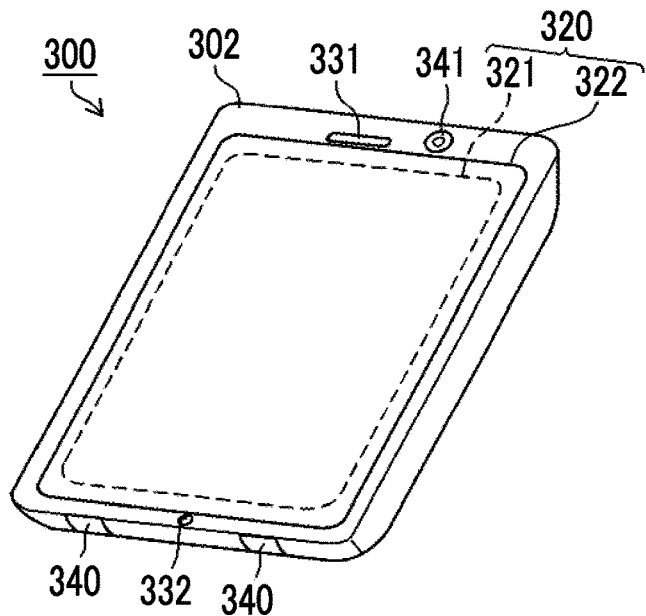
FIG. 12 is a perspective view illustrating an exterior of a smartphone in which a computer is mounted.

FIG. 12 illustrates an exterior of a smartphone 300 in which a computer is mounted. The smartphone 300 illustrated in FIG. 12 includes a casing 302 having a shape of a flat plate and comprises a display and input unit 320 in which a display panel 321 as a display unit and an operation panel 322 as an input unit are integrated on one surface of the casing 302. In addition, the casing 302 comprises a speaker 331, a microphone 332, an operation unit 340, and a camera unit 341. The configuration of the casing 302 is not for limitation purposes. For example, a configuration in which the display unit and the input unit are independently disposed can be employed, or a configuration having a folded structure or a sliding mechanism can be employed.

Figure 13:
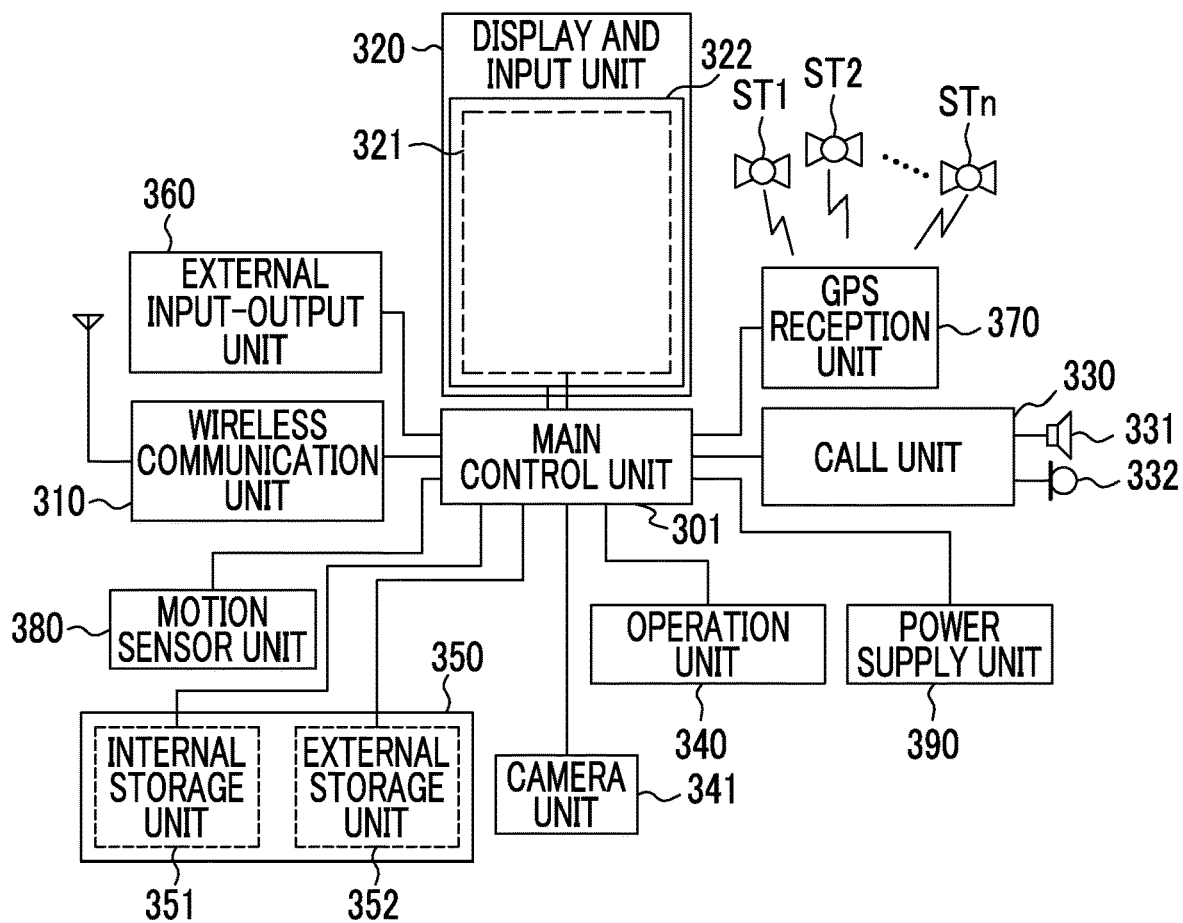
FIG. 13 is a block diagram illustrating a configuration of the smartphone.

FIG. 13 is a block diagram illustrating a configuration of the smartphone 300 illustrated in FIG. 12. As illustrated in FIG. 13, main constituents of the smartphone comprise a wireless communication unit 310, the display and input unit 320, a call unit 330, the operation unit 340, the camera unit 341, a storage unit 350, an external input-output unit 360, a global positioning system (GPS) reception unit 370, a motion sensor unit 380, a power supply unit 390, and a main control unit 301. In addition, a main function of the smartphone 300 comprises a wireless communication function of performing mobile wireless communication with a base station apparatus BS through a mobile communication network.

The wireless communication unit 310 performs wireless communication with the base station apparatus BS accommodated in the mobile communication network in accordance with an instruction from the main control unit 301. Using the wireless communication, transmission and reception of various file data such as voice data and image data, electronic mail data, and the like and reception of Web data, streaming data, and the like are performed.

The display and input unit 320 is a so-called touch panel that visually delivers information to a user by displaying images (still images and moving images), text information, and the like and detects a user operation in response to the displayed information under control of the main control unit 301. The display and input unit 320 comprises the display panel 321 and the operation panel 322.

The display panel 321 uses a liquid crystal display (LCD), an organic electro-luminescence display (OELD), or the like as a display device. The operation panel 322 is a device that is placed in a manner enabling visual recognition of an image displayed on a display surface of the display panel 321 and operated by a finger of the user or a pen type input device and detects one or a plurality of coordinates. In a case where the device is operated by the finger of the user or the pen type input device, a detection signal caused by the operation is output to the main control unit 301. Next, the main control unit 301 detects the position (coordinates) of the operation on the display panel 321 based on the received detection signal.

As illustrated in FIG. 12, the display panel 321 and the operation panel 322 of the smartphone 300 are integrated and constitute the display and input unit 320. The operation panel 322 is arranged to completely cover the display panel 321. In the case of employing such an arrangement, the operation panel 322 may comprise a function of detecting the user operation even in a region outside the display panel 321. In other words, the operation panel 322 may comprise a detection region (hereinafter, referred to as a display region) for an overlapping part in overlap with the display panel 321 and a detection region (hereinafter, referred to as a non-display region) for a peripheral part other than the overlapping part not in overlap with the display panel 321.

While the size of the display region may completely match the size of the display panel 321, both sizes may not necessarily match. In addition, the operation panel 322 may comprise two sensitive regions including the peripheral part and an inner part other than the peripheral part. Furthermore, the width of the peripheral part is appropriately designed depending on the size and the like of the casing 302. Furthermore, a position detection method employed in the operation panel 322 is exemplified by a matrix switch method, a resistive film method, a surface acoustic wave method, an infrared method, an electromagnetic induction method, an electrostatic capacitive method, and the like. Any method can be employed.

The call unit 330 comprises the speaker 331 and the microphone 332. The call unit 330 converts the voice of the user input through the microphone 332 into voice data processable in the main control unit 301 and outputs the voice data to the main control unit 301, or decodes the voice data received by the wireless communication unit 310 or the external input-output unit 360 and outputs the decoded voice data from the speaker 331. In addition, as illustrated in FIG. 12, for example, the speaker 331 can be mounted on the same surface as the surface on which the display and input unit 320 is disposed, and the microphone 332 can be mounted on a side surface of the casing 302.

The operation unit 340 is a hardware key in which a key switch or the like is used, and receives an instruction from the user. For example, as illustrated in FIG. 12, the operation unit 340 is a push-button type switch that is mounted on a side surface of the casing 302 of the smartphone 300 and is set to be in an ON state in a case where the operation unit 340 is pressed with a finger or the like and is set to be in an OFF state by restoring force of a spring or the like in a case where the finger is released.

The storage unit 350 stores a control program and control data of the main control unit 301, application software, address data in which the name, the telephone number, and the like of a communication counterpart are associated, data of transmitted and received electronic mails, Web data downloaded by Web browsing, and downloaded contents data. In addition, the storage unit 350 temporarily stores streaming data and the like. In addition, the storage unit 350 is configured with an internal storage unit 351 incorporated in the smartphone and an attachable and detachable external storage unit 352 including a slot for an external memory. Each of the internal storage unit 351 and the external storage unit 352 constituting the storage unit 350 is implemented using a storage medium such as a flash memory type, hard disk type, multimedia card micro type, or card type memory (for example, a MicroSD (registered trademark) memory)), a random access memory (RAM), or a read only memory (ROM).

The external input-output unit 360 operates as an interface for all external devices connected to the smartphone 300 and is for directly or indirectly connecting to other external devices using communication or the like (for example, Universal Serial Bus (USB)) or a network (for example, the Internet, a wireless local area network (LAN), bluetooth (registered trademark), radio frequency identification (RFID), infrared communication (infrared data association:

IrDA) (registered trademark), ultra wideband (UWB) (registered trademark), or ZigBee (registered trademark)).

For example, the external device connected to the smartphone 300 is a wired/wireless headset, a wired/wireless external charger, a wired/wireless data port, a memory card or a subscriber identity module (SIM) card/user identity module (UIM) card connected through a card socket, an external audio and video device connected through an audio and video input/output (I/O) terminal, a wirelessly connected external audio and video device, a smartphone connected in a wired/wireless manner, a personal computer connected in a wired/wireless manner, a personal digital assistant (PDA) connected in a wired/wireless manner, or an earphone. The external input-output unit delivers data transferred from the external device to each constituent inside the smartphone 300 or transfers data inside the smartphone 300 to the external device.

The GPS reception unit 370 receives GPS signals transmitted from GPS satellites ST1 to STn, executes a position measurement calculation process based on the plurality of received GPS signals, and detects the position of the smartphone 300 including latitude, longitude, and altitude in accordance with an instruction from the main control unit 301. When positional information can be acquired from the wireless communication unit 310 or the external input-output unit 360 (for example, a wireless LAN), the GPS reception unit 370 can detect the position using the positional information.

The motion sensor unit 380 comprises, for example, a three-axis acceleration sensor and detects a physical motion of the smartphone 300 in accordance with an instruction from the main control unit 301. By detecting the physical motion of the smartphone 300, a direction or acceleration of movement of the smartphone 300 is detected. The detection result is output to the main control unit 301.

The power supply unit 390 supplies power stored in a battery (not illustrated) to each unit of the smartphone 300 in accordance with an instruction from the main control unit 301.

The main control unit 301 comprises a microprocessor. The main control unit 301 operates in accordance with the control program and the control data stored in the storage unit 350 and manages and controls each unit of the smartphone 300. In addition, the main control unit 301 comprises a mobile communication control function of controlling each unit of a communication system and an application processing function in order to perform voice communication and data communication through the wireless communication unit 310.

The application processing function is implemented by operating the main control unit 301 in accordance with the application software stored in the storage unit 350. For example, the application processing function is an infrared communication function of performing data communication with an opposing device by controlling the external input-output unit 360, an electronic mail function of transmitting and receiving electronic mails, or a Web browsing function of browsing a Web page.

In addition, the main control unit 301 comprises an image processing function such as displaying a video on the display and input unit 320 based on image data (data of a still image or a moving image) such as reception data or downloaded streaming data. The image processing function is a function of causing the main control unit 301 to decode the image data, perform image processing on the decoding result, and display the image on the display and input unit 320.

Furthermore, the main control unit 301 executes display control for the display panel 321 and operation detection control for detecting the user operation through the operation unit 340 and the operation panel 322.

By executing the display control, the main control unit 301 displays an icon for starting the application software and a software key such as a scroll bar or displays a window for composing an electronic mail. The scroll bar is a software key for a large image or the like not accommodated in the display region of the display panel 321 in order to receive an instruction to move a display part of the image.

In addition, by executing the operation detection control, the main control unit 301 detects the user operation through the operation unit 340, receives an operation performed on the icon or an input of a text string in an input field of the window through the operation panel 322, or receives a scroll request for the display image through the scroll bar.

Furthermore, by executing the operation detection control, the main control unit 301 comprises a touch panel control function of determining whether the position of the operation performed on the operation panel 322 is in the overlapping part (display region) in overlap with the display panel 321 or the peripheral part (non-display region) other than the overlapping part not in overlap with the display panel 321 and controlling the sensitive region of the operation panel 322 and the display position of the software key.

In addition, the main control unit 301 can detect a gesture operation performed on the operation panel 322 and execute a preset function depending on the detected gesture operation. The gesture operation is not a simple touch operation in the related art and means an operation of drawing a trajectory with a finger or the like, specifying a plurality of positions at the same time, or drawing a trajectory from at least one of the plurality of positions by combining the drawing with the specifying.

The camera unit 341 is a digital camera performing electronic imaging using an imaging element such as a complementary metal oxide semiconductor (CMOS) imaging sensor or a charge coupled device (CCD) imaging sensor. In addition, the camera unit 341 can convert the image data acquired by imaging into compressed image data such as joint photographic coding experts group (JPEG) and record the image data in the storage unit 350 or output the image data through the external input-output unit 360 or the wireless communication unit 310 under control of the main control unit 301. In the smartphone 300 illustrated in FIG. 12, the camera unit 341 is mounted on the same surface as the display and input unit 320. However, the mount position of the camera unit 341 is not for limitation purposes. The camera unit 341 may be mounted on the rear surface of the display and input unit 320. Alternatively, a plurality of camera units 341 may be mounted. In a case where the plurality of camera units 341 are mounted, imaging can be performed using a single camera unit 341 by switching the camera unit 341 performing imaging. Alternatively, imaging can be performed using the plurality of camera units 341 at the same time.

In addition, the camera unit 341 can be used in various functions of the smartphone 300. For example, the image acquired by the camera unit 341 can be displayed on the display panel 321. The image of the camera unit 341 can be used as an operation input of the operation panel 322. In addition, in a case where the GPS reception unit 370 detects the position, the position can be detected with reference to the image from the camera unit 341. Furthermore, with reference to the image from the camera unit 341, a determination of an optical axis direction of the camera unit 341 of the smartphone 300 and a determination of the current usage environment can be performed without using the three-axis acceleration sensor or along with the three-axis acceleration sensor. The image from the camera unit 341 can also be used within the application software.

In the smartphone 300, the AE detection circuit 36 described above is included in the main control unit 301.

While examples of the present invention are described thus far, the present invention is not limited to the embodiments described above. Various modifications can be made without departing from the spirit of the present invention.

EXPLANATION OF REFERENCES

- 10: imaging apparatus
- 12: imaging optical system
- 12*f*: focus lens
- 12*i*: stop
- 12*z*: zoom lens
- 14: CCD
- 16: TG
- 18: A/D converter
- 20: image input controller
- 22: image signal processing circuit
- 24: compression/expansion processing circuit
- 26: video encoder
- 28: image display device
- 30: CPU
- 36: AE detection circuit
- 38: AF detection circuit
- 40: memory
- 42: media controller
- 44: recording medium
- 46: operation unit
- 48: motor driver
- 49: motor driver
- 50: motor driver
- 51: captured image
- 52: semi-center region
- 53: center region
- 54: main subject
- 55: main subject region
- 57: person
- 58: tree
- 59: mountain
- 101: exposure setting unit
- 103: brightness information acquisition unit
- 105: count unit
- 107: calculation unit
- 109: exposure adjustment unit
- 111: simulation unit
- 121: simulation brightness information acquisition unit
- 122: simulation count unit
- 123: simulation calculation unit
- 300: smartphone
- 301: main control unit
- 302: casing
- 310: wireless communication unit
- 320: display and input unit
- 321: display panel
- 322: operation panel
- 330: call unit
- 331: speaker
- 332: microphone
- 340: operation unit
- 341: camera unit
- 350: storage unit
- 351: internal storage unit
- 352: external storage unit
- 360: external input-output unit
- 370: GPS reception unit
- 380: motion sensor unit
- 390: power supply unit

What is claimed is:

1. An imaging apparatus comprising:
an exposure setting unit that sets a first exposure or a second exposure;
an image acquisition unit that acquires a captured image imaged at the first exposure;
a brightness information acquisition unit that acquires information related to a brightness of each pixel constituting the captured image;
a count unit that counts each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region based on the information related to the brightness;
a calculation unit that calculates a first ratio between the number of darkened pixels and the number of low brightness pixels and a second ratio between the number of washed out pixels and the number of high brightness pixels; and
an exposure adjustment unit that adjusts the first exposure to the second exposure based on the first ratio and the second ratio calculated by the calculation unit.

2. The imaging apparatus according to claim 1,
wherein the exposure adjustment unit determines a magnitude relationship between the first ratio and the second ratio, adjusts the first exposure to the second exposure acquired by increasing the first exposure by a predetermined amount of exposure in a case where the first ratio is higher than the second ratio, and adjusts the first exposure to the second exposure acquired by decreasing the first exposure by a predetermined amount of exposure in a case where the second ratio is higher than the first ratio.

3. The imaging apparatus according to claim 2,
wherein the exposure adjustment unit adjusts the first exposure to the second exposure acquired by increasing the first exposure by the predetermined amount of exposure in a case where the first ratio is higher than the second ratio and the first ratio is higher than a first threshold, and adjusts the first exposure to the second exposure acquired by decreasing the first exposure by the predetermined amount of exposure in a case where the second ratio is higher than the first ratio and the second ratio is higher than a second threshold.

4. The imaging apparatus according to claim 2, further comprising:
a simulation unit that acquires information related to a brightness of each pixel constituting a predicted captured image predicted to be acquired in a case of imaging at the second exposure, counts the number of darkened pixels, the number of low brightness pixels, the number of washed out pixels, and the number of high brightness pixels based on the information related to the predicted brightness, and calculates a third ratio between the counted number of darkened pixels and the counted number of low brightness pixels and a fourth ratio between the counted number of washed out pixels and the counted number of high brightness pixels, wherein the exposure adjustment unit adjusts the first exposure to the second exposure based on the fourth ratio calculated by the simulation unit in a case where the first ratio is higher than the second ratio, and adjusts the first exposure to the second exposure based on the third ratio calculated by the simulation unit in a case where the second ratio is higher than the first ratio.

5. The imaging apparatus according to claim 4, wherein the exposure adjustment unit adjusts the first exposure to the second exposure acquired by decreasing the first exposure by the predetermined amount of exposure in a case where the third ratio is lower than or equal to a third threshold, and adjusts the first exposure to the second exposure acquired by increasing the first exposure by the predetermined amount of exposure in a case where the fourth ratio is lower than or equal to a fourth threshold.

6. The imaging apparatus according to claim 1, wherein the count unit performs weighting depending on a position in the captured image and counts the number of darkened pixels and the number of washed out pixels.

7. The imaging apparatus according to claim 6, wherein the count unit performs the weighting on the number of darkened pixels and the number of washed out pixels in a center region of the captured image, the number of darkened pixels and the number of washed out pixels in a region of a main subject in the captured image, or the number of darkened pixels and the number of washed out pixels in a region of the captured image in focus.

8. The imaging apparatus according to claim 1, wherein the image acquisition unit acquires the captured image by a color image sensor, the brightness information acquisition unit acquires the brightness based on R, G, and B values of each pixel subjected to a demosaicing process based on an output value from the color image sensor, and the count unit determines the high brightness pixel based on the brightness and counts a pixel of which a maximum value of the R, G, and B values constituting the brightness of the determined high brightness pixel is higher than a fifth threshold as the washed out pixel.

9. An imaging method comprising:

an exposure setting step of setting a first exposure or a second exposure;

an image acquisition step of acquiring a captured image imaged at the first exposure;

a brightness information acquisition step of acquiring information related to a brightness of each pixel constituting the captured image;

a count step of counting each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region, based on the information related to the brightness;

a calculation step of calculating a first ratio between the number of darkened pixels and the number of low brightness pixels and a second ratio between the number of washed out pixels and the number of high brightness pixels; and an exposure adjustment step of adjusting the first exposure to the second exposure based on the first ratio and the second ratio calculated in the calculation step.

10. A non-transitory computer-readable tangible medium comprising computer executable instructions stored thereon, which, when executed by one or more processors, cause the one or more processors to perform an imaging method, comprising:

an exposure setting step of setting a first exposure or a second exposure;

an image acquisition step of acquiring a captured image imaged at the first exposure;

a brightness information acquisition step of acquiring information related to a brightness of each pixel constituting the captured image;

a count step of counting each of the number of darkened pixels included in a predetermined darkened region, the number of low brightness pixels included in a low brightness region wider than the predetermined darkened region, the number of washed out pixels included in a predetermined washed out region, and the number of high brightness pixels included in a high brightness region wider than the predetermined washed out region, based on the information related to the brightness;

a calculation step of calculating a first ratio between the number of darkened pixels and the number of low brightness pixels and a second ratio between the number of washed out pixels and the number of high brightness pixels; and an exposure adjustment step of adjusting the first exposure to the second exposure based on the first ratio and the second ratio calculated in the calculation step.

* * * * *